United States Patent [19]

Andersson

[11] 4,135,550

[45] Jan. 23, 1979

[54] PINCH VALVE CONTROL CIRCUIT

[75] Inventor: Sven E. Andersson, Chagrin Falls, Ohio

[73] Assignee: Trelleborg Rubber Company, Inc., Solon, Ohio

[21] Appl. No.: 776,630

[22] Filed: Mar. 11, 1977

[51] Int. Cl.$^2$ ............................................. F16K 7/07
[52] U.S. Cl. ................................... 137/565; 137/846; 222/55; 251/5; 251/24; 251/25; 251/118; 417/295
[58] Field of Search .......................... 251/5, 7, 24, 61.1, 251/145, 118; 222/55; 417/295; 137/565

[56] References Cited

U.S. PATENT DOCUMENTS

| 615,751 | 12/1898 | Sands | 137/846 |
|---|---|---|---|
| 3,007,416 | 11/1961 | Childs | 251/5 X |
| 3,669,142 | 6/1972 | Gerbic | 251/24 X |

FOREIGN PATENT DOCUMENTS

132806  5/1949  Australia ..................................... 251/5

Primary Examiner—Martin P. Schwadron
Assistant Examiner—Richard Gerard
Attorney, Agent, or Firm—Meyer, Tilberry & Body

[57] ABSTRACT

A control circuit is disclosed for a sleeve-type pinch valve and which control circuit utilizes an internal vacuum condition in a main supply line in which the valve is disposed to retain the elastomeric sleeve of the valve open. A check valve is provided in the control circuit to prevent backflow of material from the main supply line into the control circuit and pinch valve. A unique check valve disclosed for this purpose includes an expandable tubular diaphragm of elastomeric material normally closed at one end and which opens cylindrically so as to impose no restriction to one-way flow of material therethrough. The one end collapses when flow is interrupted, thus to prevent backflow through the valve.

12 Claims, 9 Drawing Figures

PINCH VALVE CONTROL CIRCUIT

This invention relates to the art of valves and, more particularly, to a control circuit for controlling opening and closing of a sleeve-type pinch valve and a unique check valve in the control circuit.

The control circuit and check valve of the present invention find particular utility in conjunction with controlling the opening and closing of pinch valves in flow lines handling abrasives in suspension, such as coal slurries. Accordingly, the invention will be disclosed and described in detail with regard to such use. It will be appreciated, however, that the invention is equally applicable to controlling such pinch valves in flow lines handling materials other than abrasives in suspension and which materials may be of an abrasive or non-abrasive nature, such as sand, paper pulp, oil, chemicals and the like.

As is well known, sleeve-type pinch valves are commonly employed in flow lines devised to convey abrasive slurries which would erode gate, ball and other types of valves. A pinch valve basically comprises a flexible sleeve of elastomeric material such as rubber through which the slurry passes and which sleeve is transversely constrictable by pinching action to restrict or completely stop the flow of material therethrough. Generally, the constricting function is achieved either through manually actuable jaws which squeeze the sleeve or through the use of fluid under pressure introduced into a chamber surrounding the sleeve in the valve housing.

One problem in particular has been encountered in connection with efforts to use such sleeve-type pinch valves in a flow line wherein a vacuum or reduced pressure condition exists or occurs in the flow line during a fluid flow operation. In this respect, a vacuum condition causes partial or complete collapse of the sleeve and thus undesirable restriction, or cut-off, of flow therethrough. Such a vacuum condition is a common occurrence, for example, in a system employing a reservoir or tank for an abrasive slurry and a pump downstream from the pinch valve for pumping the material from the tank. As the head in the tank drops, the pressure in the flow line from the tank through the pinch valve to the pump also drops and, eventually, the pump draws a vacuum within the flow line and, thus, within the pinch valve. This vacuum causes a partial or total collapse of the sleeve valve and either restricts or cuts-off the normal flow of fluid through the flow line before the supply tank is emptied.

It has been the practice heretofore to apply a vacuum between the interior of the valve housing and the flexible sleeve to prevent collapse of the sleeve. Such previous efforts, however, have required the use of an auxiliary vacuum supply and thus either additional equipment such as a separate vacuum pump, or an elaborate reversible pressure-vacuum pump in the control supply line for the valve. Additionally, separate and often elaborate controls are required for such equipment. For example, it is necessary to detect an undesirable pressure drop and to actuate the vacuum pump in response to such a drop. It will be appreciated therefore that such previous efforts are not only expensive to construct, install and operate, but are also expensive to maintain and require additional space for auxiliary equipment and controls.

In accordance with the present invention, a control system is provided which overcomes or avoids the disadvantages of previous arrangements including those specifically mentioned above. More particularly, in accordance with the invention, a sleeve-type pinch valve is maintained open during a vacuum condition in the flow line by utilizing the vacuum in the line. In this respect, a chamber surrounding the valve sleeve is directly connected to the flow line in which the valve is located and downstream of the valve. Preferably, the pinch valve is positively closeable by a source of fluid under pressure, and the fluid and vacuum flows are selectively controlled by a common control valve in the system. In order to enhance maintaining the valve open under a vacuum condition in the flow line, the latter is preferably provided with a fixed restriction or venturi between the valve sleeve and the vacuum line opening into the flow line. This increases the vacuum at the vacuum line inlet and thereby increases the pressure differential across the valve sleeve in favor of keeping the valve open. Advantageously, the vacuum line can be left open during all periods of flow through the valve and will respond to the occurrence of a vacuum condition in the flow line. Accordingly, no special controls or detecting devices are necessary to assure that the valve remains open.

Further, in accordance with the invention, a check valve is interposed in the vacuum line between the inlet thereto from the main flow line and the chamber surrounding the pinch valve sleeve. The check valve allows the vacuum to be drawn in the chamber surrounding the sleeve while preventing flow of material in the main flow line back into the control circuit and valve chamber when the vacuum condition is removed. In accordance with another aspect of the invention, a unique check valve is provided which is particularly advantageous both in connection with the vacuum control system of the invention and in connection with flow systems involving the flow of abrasive slurries. In this respect, the check valve minimizes restriction of flow therethrough, and minimizes abrasive wear of valve elements. Such restriction and wear problems are encountered in connection with the use of ball, gate and poppet-type check valves in fluid flow systems in general and, especially, in abrasive slurry flow systems. In the latter type valves, the closing element is physically interposed in or obstructs the flow stream and, therefore, is subjected to wear and restricts flow across the valve. Further, upon closure of such a valve in an abrasive slurry line, abrasive material in the system can and does lodge between the closure element and its seat, thus promoting wear of the element and seat and leakage across the valve. Such wear and leakage can also occur if such a check valve is used in a control circuit of the character described above where a vacuum opens the check valve. In this respect, the downstream side of the valve is exposed to the abrasive material being handled and therefore it is to be expected that a certain amount of such material will work its way between the component parts of the valve upon removal of the vacuum.

The check valve provided in accordance with the present invention advantageously minimizes or overcomes the flow restriction and wear problems referred to above. In this respect, the valve employs an elastomeric sleeve-type diaphragm structure which is normally closed at one end and which, during flow through the valve, is substantially cylindrical in form. Accordingly, little or no restriction is imposed on the flow characteristics of the fluid. Further, the elastomeric sleeve provides a smooth flow surface therethrough, thus further promoting a reduction in flow restriction and minimizing wear of the valve. In the normally closed condition of the check valve, the downstream end of the diaphragm is collapsed to seal against any backflow of material through the check valve. The resiliency of the diaphragm material enables the closed end to engage around any abrasive material trapped therein, thus to minimize wear on the valve when closed and to prevent leakage across the valve.

It is therefore a principle object of the present invention to provide an improved control system for maintaining a sleeve-type pinch valve open under a vacuum condition in a flow line including the valve.

Another object is the provision of an improved control system for the foregoing purpose in which a vacuum condition in the flow line is utilized to maintain the pinch valve open.

A further object is the provision of such a control system which includes a restriction interposed in the flow line to increase the vacuum otherwise available.

Yet another object is the provision of a control system of the foregoing character which is capable of automatic response to a vacuum condition in the flow line to utilize the internal vacuum to maintain the pinch valve open.

Yet a further object is the provision of a control system of the foregoing character which includes a unique check valve structure for preventing backflow of material in the flow line to the control system.

Another object is the provision of a control system of the foregoing character which is inexpensive to produce, easy to install with respect to a pinch valve and flow line, and which is highly efficient in operation.

Still a further object of the present invention is the provision of an improved check valve particularly for use in a flow control system for abrasive slurries and the like.

Another object of the present invention is the provision of an improved check valve which minimizes restriction of flow therethrough and minimizes valve wear.

Yet another object is the provision of a check valve in the form of a tubular diaphragm of elastomeric material having one end normally closed and expandable to a generally cylindrical contour by flow therethrough.

These and other objects of the invention will in part be obvious and in part pointed out more fully hereinafter in conjunction with the written description of preferred embodiments of the invention illustrated in the accompanying drawings in which:

Figure 1:
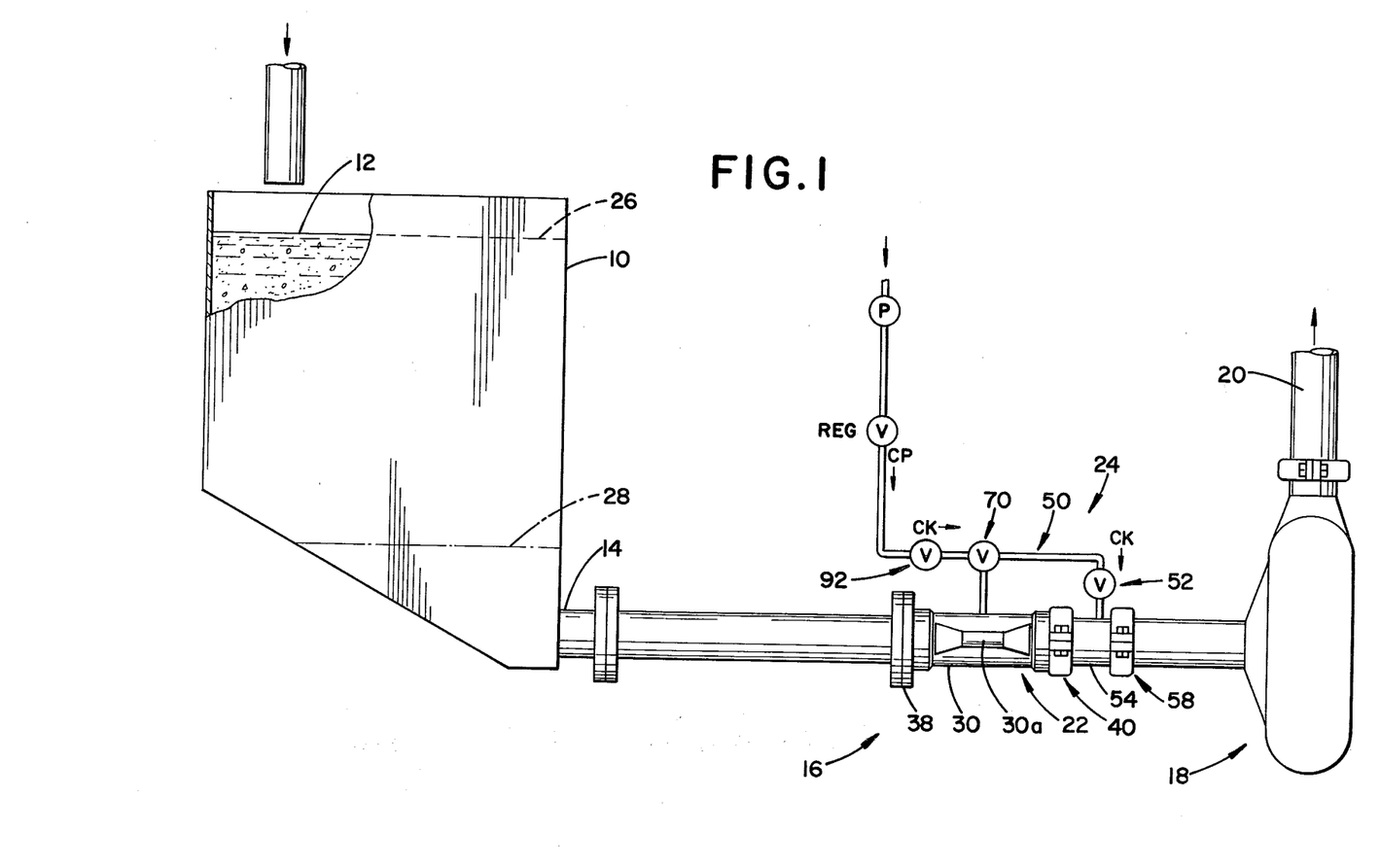
FIG. 1 is a schematic representation of a slurry delivery system including a pinch valve and a control circuit therefor in accordance with the present invention.

Referring now in greater detail to the drawings wherein the showings are for the purpose of illustrating preferred embodiments of the invention only and not for the purpose of limiting the invention, FIG. 1 schematically illustrates a fluid flow system including a reservoir or tank 10 adapted to receive a hold fluid 12, such as an abrasive slurry. Tank 10 has an outlet connection 14 adjacent the bottom thereof and connected to a main flow line 16 which leads to the inlet of a pump 18 by which fluid 12 is withdrawn from tank 10 and delivered to a point of use or disposal by means of a line 20 connected to the discharge end of pump 18.

Main flow line 16 includes a sleeve-type pinch valve 22 and, in accordance with the present invention, a control circuit 24 described in detail hereinafter is provided to maintain valve 22 open during periods of operation of pump 18 which cause a vacuum condition to exist within the valve. For example, tank 10 may be initially filled with fluid 12 to a level 26 which provides a pressure head for flow of fluid from the tank when pump 18 is in operation. In the event that additional material is not introduced into tank 10, the fluid level will drop to a level within the tank which, for a given rate of pumping by pump 18, creates a vacuum in the main flow line tending to radially collapse the resilient sleeve of valve 22 to prevent further withdrawal of fluid from the tank. For purposes of illustration, such a low level in tank 10 is represented by the numeral 28. Such a condition and the consequent closure of valve 22 of course prevents withdrawal of all of the fluid from tank 10. As will become apparent hereinafter, control circuit 24 of the present invention advantageously operates to maintain valve 22 open under a vacuum condition within the main flow line, thus to enable emptying of tank 10.

As best seen in FIGS. 2–5, valve 22 includes a housing 30 supporting a sleeve 32 of elastomeric material such as rubber. In the valve shown, the opposite ends of sleeve 32 extend axially beyond the corresponding end of housing 30, and the ends of the sleeve are provided with metal collars 34 having circumferential recesses 36 therein. Recess 36 in the collar at the upstream end of sleeve 32 accommodates a flange member 38 by which the corresponding end of valve 22 is mounted in the flow line, and recess 36 in the collar at the downstream end of sleeve 32 accommodates a split ring clamp assembly 40 by which the corresponding end of valve 22 is connected in the flow line and to a component of the control circuit to be described in detail hereinafter. The opposite ends of housing 30 are circumferentially recessed to receive seals 42 which seal against leakage between the ends of housing 30 and the corresponding collar 34.

The portion of resilient sleeve 32 between collars 34 is unattached to housing 30 and thus is radially constrictable relative thereto. Such constriction enables displacement of the sleeve radially inwardly of housing 30 to the broken line position 32a to enable closure of the valve in a well known manner. Further, as is well known, such constriction can be achieved either through mechanically actuated jaws within the valve housing or, as in the embodiment disclosed, by introducing fluid under pressure into the space between the outer surface of sleeve 32 and the inner surface of housing 30.

Figure 4:
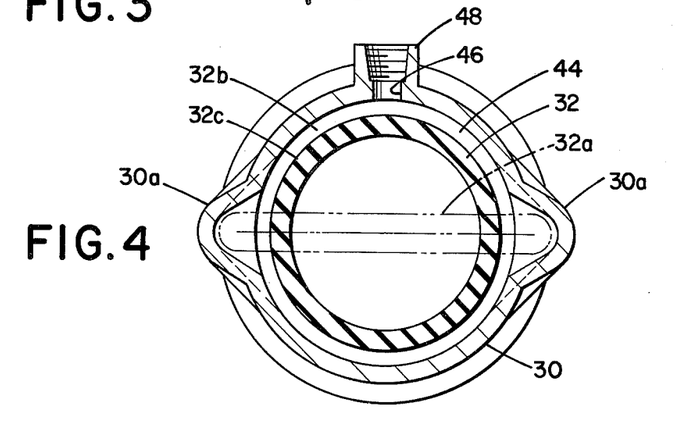
FIG. 4 is a cross-sectional view of the pinch valve taken along line 4—4 in FIG. 3.
Figure 5:
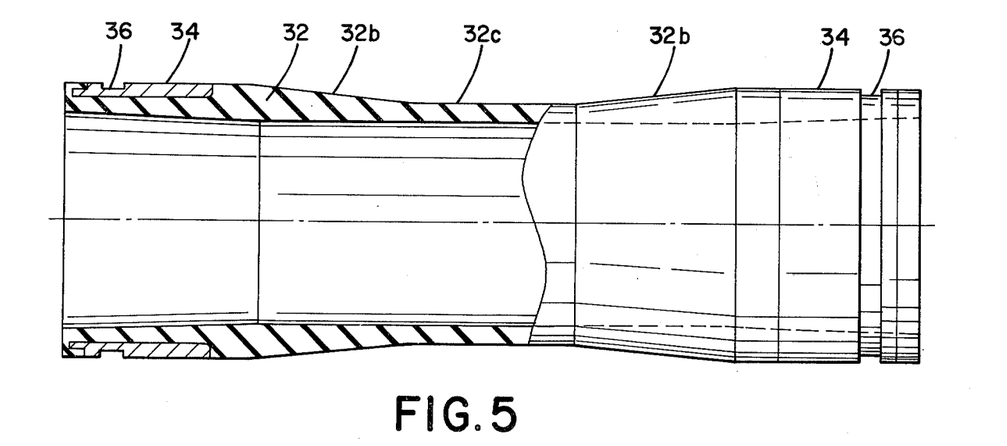
FIG. 5 is a side elevational view, partially in section, of the flexible sleeve of the pinch valve.

In the embodiment disclosed, the outer surface of sleeve 32 is contoured to provide radially and axially inwardly tapering outer surface portions 32b and an axially extending intermediate portion 32c. This contour provides for the intermediate portion of sleeve 32 to have a thinner wall dimension than the ends of the sleeve to enhance constriction of the sleeve. It will be appreciated that constriction of sleeve 32 promotes spreading of the constricted walls in a plane perpendicular to the direction of constriction, as best seen in FIG. 4, and to facilitate this displacement the sides of housing 30 are provided with axially and radially extending recesses defined by wall portion 30a of the housing. It will be appreciated from the foregoing description of sleeve 32 that a chamber 44 is defined between the sleeve and housing which extends circumferentially about sleeve 32. Control fluid under pressure, such as air or water, is adapted to be introduced into chamber 44 through a control fluid passageway 46 opening through housing 30 into the chamber. Opening 46 is surrounded by a radially outwardly extending circular nipple 48 which facilitates connection of the valve to a source of control fluid and, in the embodiment shown, to vacuum control circuit 24, as described hereinafter.

Figure 2:
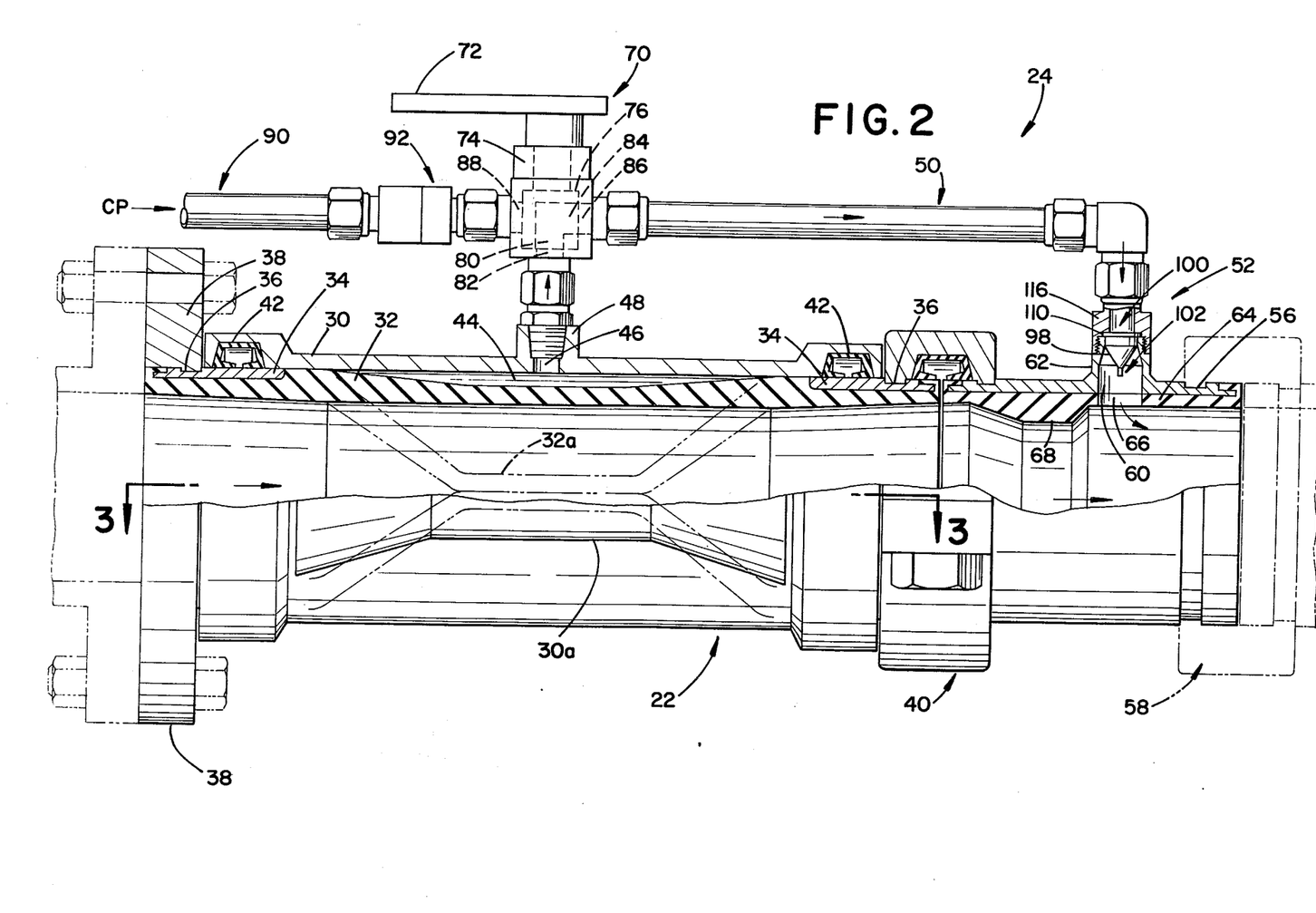
FIG. 2 is a side elevational view, partially in section, of the pinch valve and control circuit shown in FIG. 1.
Figure 3:
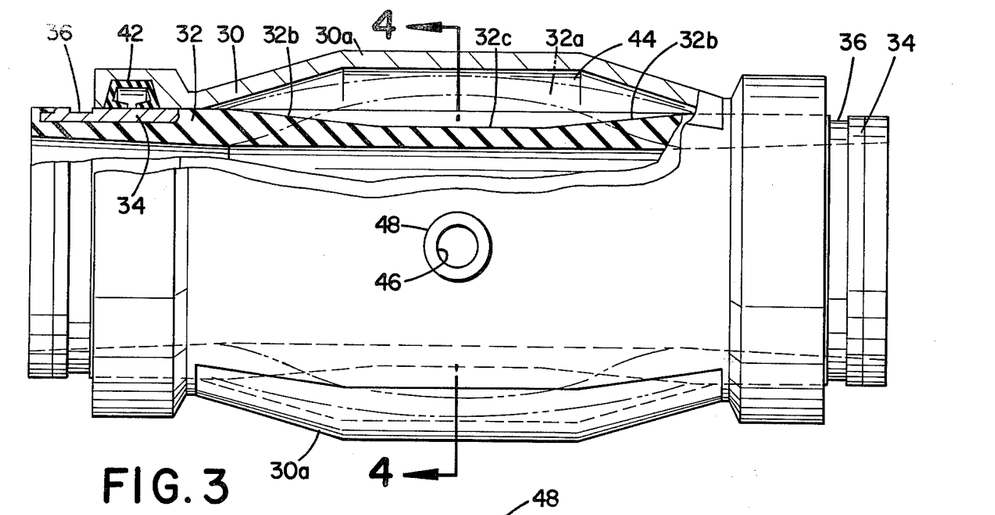
FIG. 3 is a plan view, partially in section, of the pinch valve as seen along line 3—3 in FIG. 2.

As best seen in FIG. 2, control circuit 24 includes a vacuum flow line 50 having opposite ends adapted to be connected in flow communication with chamber 44 and with main flow line 16 at a point downstream from valve 22. Preferably, a one-way check valve 52 is provided in vacuum line 50 adjacent the entrance thereof to the main flow line. A preferred valve for this purpose is described hereinafter and, in any event, the check valve is disposed in line 50 to permit flow in the direction from chamber 44 to the main flow line and to prevent backflow of material in the main flow line to chamber 44 through vacuum line 50. In the embodiment disclosed, connection of control circuit 24 in main line 16 is achieved through a short tubular coupling sleeve 54 having peripheral recesses 56 extending circumferentially about its opposite ends, one for accommodating split ring clamp assembly 40 at the downstream end of valve 22 and the other accommodating a similar split ring clamp assembly 58 for coupling the downstream end of sleeve 54 with an adjacent section of the main flow line. Sleeve 54 is provided with a flow passage 60 which is surrounded by a radially outwardly extending circular nipple 62 by which sleeve 54 and vacuum line 50 are coupled and in which check valve 52 is supported as set forth hereinafter. For the purpose which will become apparent hereinafter, the inner surface of sleeve 54 is provided with a removable liner 64 of elastomeric material such as rubber, which liner includes an opening 66 aligned with passage 60, and a radially inwardly extending restriction 68 upstream from openings 60 and 66 to define a venturi section.

The upstream end of vacuum flow line 50 is connectable in fluid flow communication with pinch valve chamber 44 through a three way valve 70 which, in the embodiment disclosed, is manually operable by means of an operating handle 72. Basically, valve 70 includes a housing 74 suitably coupled with nipple 48 of valve housing 30 and, as schematically shown in FIG. 2, supporting a valve element 76 which is rotatable about a vertical axis by means of operating handle 72. Valve element 76 includes a through passageway having a vertical portion 80 coaxial with the valve element axis and with a passageway 82 in housing 74. Accordingly, passageway portion 80 is in continuous communication with pinch valve chamber 44. The through passageway further includes a horizontal portion 84 which, by rotation of operating handle 72, is selectively positionable in alignment with opposed passageways 86 and 88 in housing 74. When passageway portion 84 is aligned with passageway 86 as shown in FIG. 2, pinch valve chamber 44 is in fluid flow communication with main flow line 16 through vacuum line 50.

A control fluid flow line 90 is suitably coupled with valve housing 74 in communication with passageway 88 therein, and the other end of line 90 is connected to a suitable source of control fluid under pressure, not shown. Preferably, a check valve 92 is included in line 90 to prevent the backflow of control fluid from chamber 44 through line 90. When valve element 76 is in the position shown in FIG. 2, passage 88 in housing 74 is closed by the valve element, thus to block fluid flow through line 90 to pinch valve chamber 44. When operating handle 72 is rotated 180° from the position shown in FIG. 2, portion 84 of the through passageway in valve element 76 is aligned with passage 88 in the valve housing, thus to connect line 90 in flow communication with pinch valve chamber 44. At the same time, this disposition of valve element 76 closes passage 86 in valve housing 74 to close vacuum line 50 with respect to pinch valve chamber 44.

With reference in particular to FIGS. 1 and 2, operation of the system during a pumping operation is as follows. Presuming slurry tank 10 to be filled to level 26 prior to the pumping operation, valve 70 would be positioned 180° from that shown in FIG. 2 so that the passageway therethrough connects pinch valve chamber 44 in flow communication with control fluid line 90. Accordingly, control fluid under pressure fills pinch valve chamber 44 constricting sleeve 32 to the broken line position 32a thereof to close the pinch valve and thus block flow through main flow line 16 from tank 10. When it is desired to pump slurry from tank 10, valve 70 is actuated to the position shown in FIG. 2 establishing communication between pinch valve chamber 44 and main flow line 16 and closing off flow of control fluid under pressure to chamber 44 through line 90. Therefore, the control fluid under pressure in pinch valve chamber 44 flows through valve 70 and vacuum line 50 into the main flow line allowing sleeve 32 to radially expand to the solid line position thereof in FIG. 2, whereby the pinch valve is opened.

Pump 18 is then operated to positively pump slurry 12 from tank 10 through the main flow line. Initially, the level of slurry in tank 10 produces a pressure head providing a positive pressure in valve 22 which maintains sleeve 32 in an open disposition. At this time there is a slight pressure drop across restriction 68 creating a vacuum which enhances maintaining sleeve 32 in its open disposition by drawing a vacuum in valve chamber 44 through check valve 52, line 50 and valve 70. As the level of slurry in tank 10 descends the pressure head decreases and, eventually, the slurry level is such that pump 18 draws a vacuum in main line 16 tending to constrict valve sleeve 32 from the solid line position toward the broken line position shown in FIG. 2. Such constriction of course restricts flow through valve 22 and, if not controlled, the increasing vacuum drawn by pump 18 would eventually close the valve before tank 10 is empty. In accordance with the present invention, however, vacuum control circuit 24 operates to maintain sleeve 32 in its expanded condition so that valve 22 remains open until tank 10 is empty. In this respect, it will be appreciated that a vacuum condition or pressure drop across valve 22 draws a vacuum in valve chamber 44 corresponding to the pressure drop, thus to restrain constriction of sleeve 32. Of course, as the pressure drop across the valve increases so does the vacuum drawn in chamber 44. Moreover, restriction 68 at the downstream end of valve 22 enhances the drawing of a vacuum in valve chamber 44 in that the pressure drop across restriction 68 is greater than the pressure drop which would exist in the absence of the restriction.

When the tank has been emptied, or when it is otherwise desired to discontinue flow through main flow line 16, pump 18 is de-energized and valve 70 is displaced 180° from the position shown in FIG. 2, thus to again connect pinch valve chamber 44 with control fluid under pressure in line 90. Check valve 52 prevents the backflow of material from main flow line 16 toward valve chamber 44 through vacuum line 50. This is particularly advantageous where the material in the flow line is an abrasive slurry in that abrasive material is prevented from entering chamber 44 and eventually adversely effecting operation of valve 22. It should be noted at this point too that the initial actuation of valve 70 to communicate pinch valve chamber 44 with main flow line 16 advantageously provides for the control fluid in chamber 44 to flow through vacuum line 50 and check valve 52, thus to clean the latter and displace abrasive material thereon into the main flow line. In this respect, check valve 92 in control fluid line 90 serves to maintain control fluid under pressure in pinch valve chamber 44 to maintain sleeve 32 in its constricted disposition in the event of loss of pressure in control fluid line 90. Thus, when valve 70 is actuated to communicate chamber 44 with main flow line 16, the fluid under pressure flows to line 16. It is of course possible that some condition such as a blockage in main flow line 16 downstream of valve 22 could occur which would create a back pressure on pinch valve 22 when vacuum line 50 is in communication with valve chamber 44. Under such a condition, check valve 52 advantageously prevents material in the main flow line from entering the vacuum line, and the back pressure will maintain sleeve 32 open.

While it is preferred to provide restriction 68 upstream of vacuum line passage 60 to enhance vacuum control of sleeve 32, it will be appreciated that a vacuum condition created in the main flow line at valve 22 by pump 18 would alone operate to draw a vacuum in pinch valve chamber 44. Likewise, it will be appreciated that passage 60 for the vacuum flow line need only be located downstream of the constrictable portion of valve sleeve 32. Thus, in connection with a different pinch valve construction for example, passage 60 could open through the non-constrictable downstream end of the valve sleeve. Coupling sleeve 54 which includes passage 60 in the embodiment disclosed is merely preferred because it simplifies the pinch valve structure and simplifies installation of the vacuum control circuit in an existing flow line. Additionally, sleeve 54 facilitates the use of a venturi section which can be readily replaced, whereas a similar restriction provided for example on the downstream end of pinch valve sleeve 32 would require replacement of the entire pinch valve sleeve.

It will be further appreciated, as mentioned hereinabove, that normal closing and opening operations of sleeve 32 could be achieved through a mechanical jaw type actuator within valve casing 30, whereby the vacuum control circuit would function independent of the actuating arrangement. In such a modification, vacuum line 50 could open into pinch valve chamber 44 without the necessity of a multi-way valve corresponding to valve 70 in the embodiment disclosed. Check valve 52 would still operate to prevent backflow of material into chamber 44 and would open to permit drawing a vacuum therein. Such vacuum could be released when necessary such as through a suitable vacuum release valve communicating chamber 44 or line 50 with atmosphere. Still further, while not preferred, it will be appreciated that valve 70 alone could be employed to open vacuum line 50 to main flow line 16 and to close the vacuum line against flow of material from main line 16 into valve chamber 44. Moreover, valve 70 could, for example, be a suitable solenoid actuated valve rather than a manually operable valve. Generally, the control fluid under pressure employed in conjunction with pinch valves of the character described herein is water or air. However, it will be appreciated that other suitable fluids can be employed for this purpose.

Figure 6:
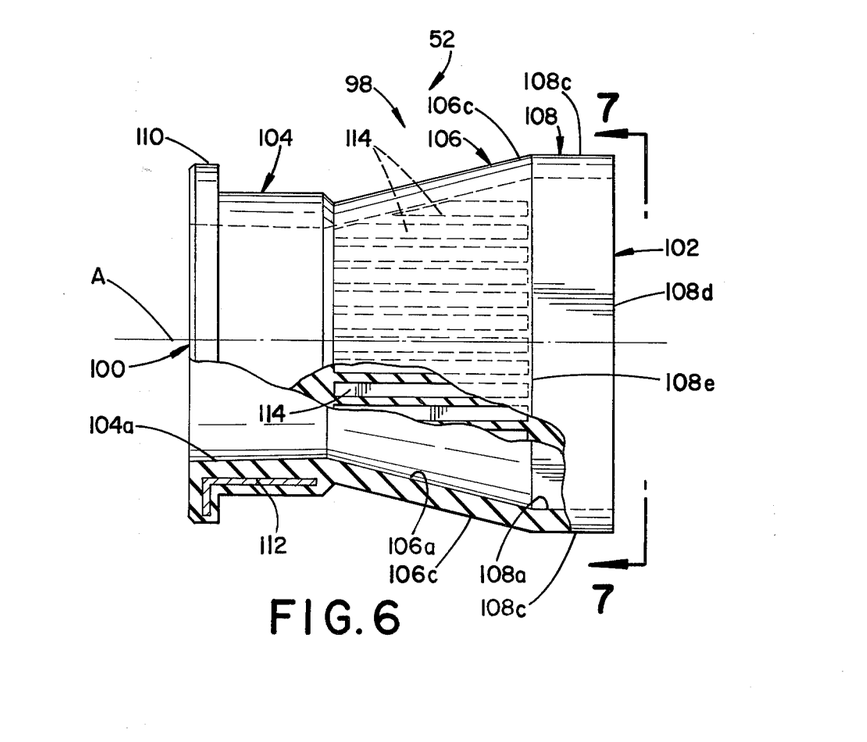
FIG. 6 is a plan view, partially in section, of a diaphragm check valve in accordance with the present invention.
Figure 7:
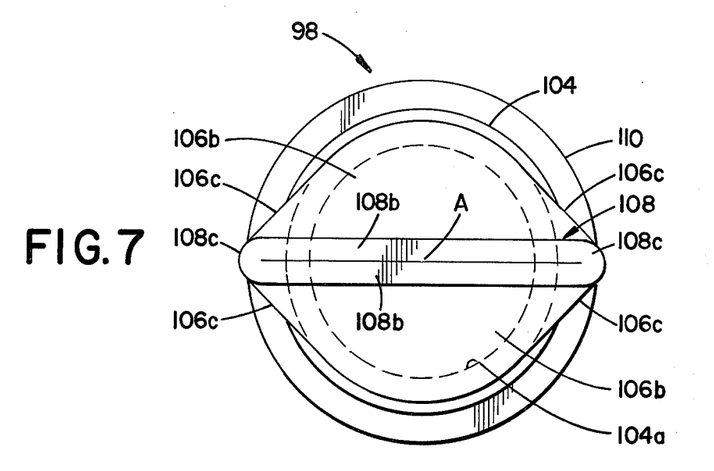
FIG. 7 is an end elevation view of the diaphragm as seen along line 7—7 in FIG. 6.
Figure 8:
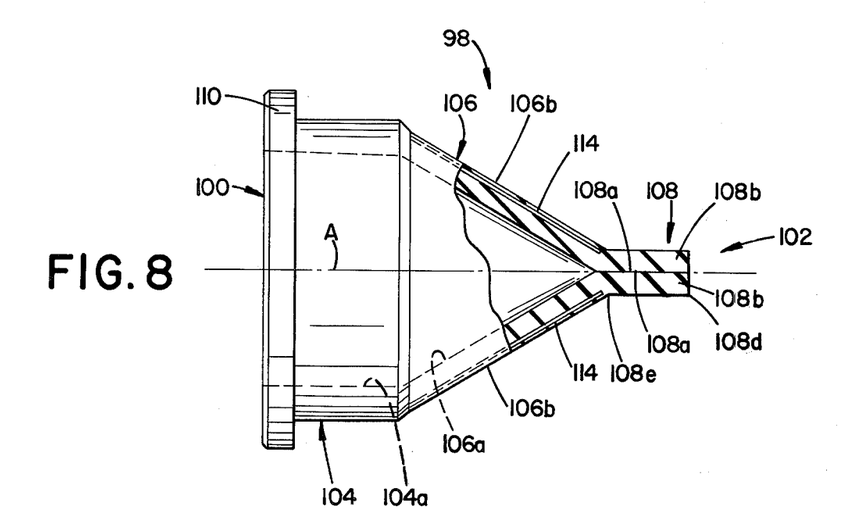
FIG. 8 is a side elevation view, partially in section, of the diaphragm.

A preferred structure for check valve 52 in the system described hereinabove is shown in FIGS. 6–8 of the drawing. In this respect, the check valve is in the form of a sleeve of elastomeric material such as rubber configured to provide a diaphragm 98 permitting fluid flow therethrough in one direction only. Diaphragm 98 has an axis A and inlet and outlet ends 100 and 102, respectively, with respect to the direction of fluid flow therethrough. The elastomeric material of the diaphragm provides a wall between ends 100 and 102 which is peripherally closed therebetween and structured to provide a cylindrical portion 104, defining an inlet opening into the diaphragm, and a constricted portion including a transition portion 106 and a normally closed lip portion 108 defining the outlet end of the diaphragm. Cylindrical portion 104 includes a circumferentially extending radially outwardly projecting mounting flange 110 and, preferably, the cylindrical portion and mounting flange are reinforced by means of a flanged metal ring 112 embedded in the elastomeric material.

As best seen in FIGS. 7 and 8, wall portion 106 provides a transition from the cylindrical cross-sectional contour of wall portion 104 to a planar configuration at lip portion 108 which extends transverse to diaphragm axis A. Wall portion 106 and lip portion 108 are radially expandable in response to fluid flow through the diaphragm from end 100 towards end 102 and, preferably, full radial expansion results in inner surfaces 106a and 108a of portions 106 and 108 to have a circular configuration corresponding diametrically to that of inner surface 104a of cylindrical portion 104. This enables unrestricted flow through the diaphragm in the desired direction and a smooth flow path for the fluid as defined by the inner surface of the diaphragm between the opposite ends thereof.

It will be appreciated that the cross-sectional configuration of transition portion 106 and lip portion 108 is equivalent to that which would be achieved by radially squeezing one end of a cricular tube to close the end in the manner shown in FIGS. 6–8. Accordingly, wall portion 106 is defined by opposed portions 106b converging axially and radially from cylindrical portion 104, and opposed portions 106c which converge axially and diverge radially from portion 104 toward lip portion 108. It will be further appreciated that this configuration provides for lip portion 108 to be defined by opposed planar lips 108b joined at their sides by portions 108c. Lips 108b and side portions 108c thus define a planar slit at the outlet end of the diaphragm. The flat configuration of lip portions 108d advantageously enables back pressure against the diaphragm to increase sealing engagement between the lip portions to provide a tight seal against reverse flow through the diaphragm.

The axially flat configuration of lip portions 108b provides for each to have axially spaced outer and inner edges 108d and 108e, respectively, and preferably wall portion 106 of diaphragm is provided with reinforcement between inner edges 108e and the axially inner end of cylindrical portion 104. Such reinforcement stabilizes the diaphragm against radial collapse under back pressure thereagainst and, at the same time, provides for the reinforced area of wall portion 106 to be sufficiently flexible to enable the radial expansion necessary for the diaphragm to have the cylindrical contour referred to hereinabove during flow therethrough. In the preferred embodiment, such reinforcement is provided by a plurality of axially extending thin metal strips 114 embedded in opposed portions 106b of wall portion 106 in laterally spaced apart parallel relationship.

Referring now to FIG. 1, it will be seen that diaphragm 98 of check valve 52 is positioned in nipple 62 in a disposition enabling flow only in the direction from pinch valve chamber 44 to main flow line 16. Diaphragm 98 is supported in nipple 62 by engagement of diaphragm flange 110 between the outer end of nipple 62 and a shoulder on a coupling nut 116 threadedly engaged with nipple 62. It will be appreciated that check valve 92 in control fluid line 90 can also be a diaphragm 98 disposed in the flow line to enable flow only in the direction from the pressurized fluid supply toward pinch valve chamber 44.

Figure 9:
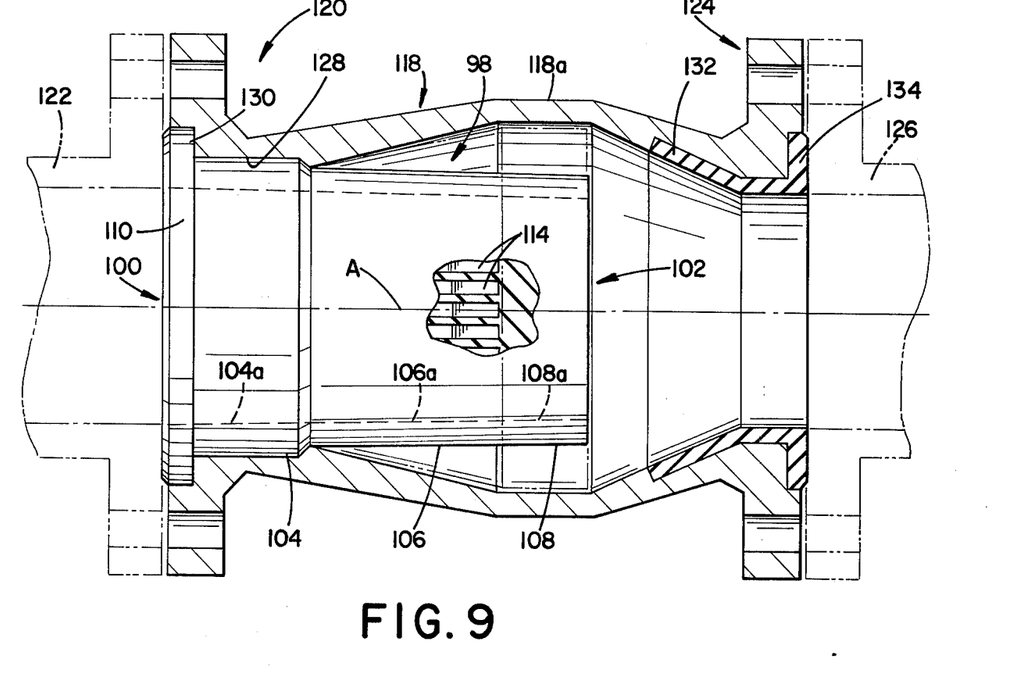
FIG. 9 is a plan view, in section, showing the diaphragm in a housing interposed in a flow line.

As mentioned hereinabove, the diaphragm check valve herein disclosed is particularly useful in a flow line arrangement in which an abrasive slurry flows through the check valve as well as in the vacuum control circuit arrangement described herein in which the check valve functions to prevent backflow of slurry into the control circuit. In this respect, radial expansion of the constricted portion of the diaphragm to a cylindrical configuration corresponding to that of the inlet end advantageously provides for unrestricted flow through the valve and a flow path of generally uniform diameter throughout the length of the diaphragm and which flow path is defined by a smooth surface, thus to minimize abrasive wear and restricted flow characteristics normally encountered in connection with a check valve having a valve element such as a ball disposed in the path of fluid flow. FIG. 9 illustrates diaphragm 98 in association with a housing adapted to be connected in a fluid flow line such as that for an abrasive slurry and in which only one-way flow is desired. Referring now to FIG. 9, diaphragm housing 118 has an inlet end 120 flanged for connection with a fluid flow line 122 and an outlet end 124 flanged for connection with a flow line 126. The inlet end of housing 118 is provided with a cylindrical, axially extending recess 128 adapted to receive cylindrical portion 104 of diaphragm 98. Inlet end 118 further includes a radially extending recess 130 adapted to receive flange 110 of the diaphragm, whereby the flange both facilitates support of the diaphragm in housing 118 and provides for sealing engagement between the flanges of housing 118 and flow line 122. In a manner similar to pinch valve housing 30 described herein, a portion 118a of check valve housing 118 is laterally enlarged to receive wall portions 106d and the sides of lip portion 108 of diaphragm 98 when the latter is in the closed disposition as indicated by broken lines in FIG. 9. In FIG. 9, wall portion 106 of the diaphragm and lip portion 108 are shown in radially expanded disposition in which inner surfaces 106a and 108a thereof are parallel with inner surface 104a of cylindrical portion 104 of the diaphragm.

The downstream end of housing 118 preferably receives a removable liner 132 of elastomeric material having a flanged end 134 which facilitates both retention of the liner in the housing and establishing a seal between the housing flange and the flange of flow line 126. Liner 132 advantageously protects the inner surface of housing 118 against the erosive effect of abrasive material in a slurry being flowed through the check valve. It will be appreciated of course that when flow through the valve is stopped, or a back pressure occurs downstream from the valve tending to induce flow from outlet end 102 toward inlet end 100, the outlet end of the diaphragm constricts to the closed configuration to prevent such backflow.

While considerable emphasis has been placed herein on specific structures and structural interrelationships between the component parts of the vacuum control system and check valve of the present invention, it will be appreciated that many embodiments of the invention can be made and that many changes can be made in the preferred embodiments herein illustrated and described without departing from the principles of the present invention. Accordingly, it is to be distinctly understood that the foregoing descriptive matter is not to be interpreted merely as illustrative of the present invention and not as a limitation.

What is claimed is:

1. In a fluid flow system including main flow line means connected to a fluid supply and having a discharge end, means to pump fluid from said supply toward said discharge end, said main flow line means including normally open valve means between said supply and said pump means and including a housing supporting resilient sleeve means therein, said sleeve means alone defining the flow path through said valve means and being constrictable relative to said housing to close said valve means and to define variable volume chamber means with said housing, and means to constrict said sleeve means to close said valve means, the improvement comprising: means providing vacuum flow line means connecting said chamber means in fluid flow communication with said main flow line means at a location downstream of said constrictable sleeve means, said vacuum flow line means adapted to provide continuous open flow communication in the direction from said chamber means toward said location in the open position of said valve means for creating a vacuum in said chamber means in response to any pressure drop across said valve means, and said vacuum flow line means including control valve means to prevent flow of fluid from said main flow line means to said chamber means.

2. The improvement according to claim 1, wherein said control valve means includes normally closed check valve means permitting flow in the direction from said chamber means toward said location.

3. The improvement according to claim 2, wherein said check valve means comprises a tubular member of elastomeric material including wall means having opposite ends, said wall means at one of said ends being open to provide an entrance for fluid flow into said member in a first direction from said one end toward the other, said wall means at said other of said ends being constricted to close said other end against fluid flow into said member in the direction opposite said first direction, and said wall means at said other end being expandable to permit fluid flow through said member in said first direction.

4. The improvement according to claim 1, wherein said means providing vacuum flow line means includes a vacuum line portion opening into said main flow line means at said location and connected to said control valve means and means connecting said control valve means in flow communication with said chamber means, said means to constrict said sleeve means being fluid under pressure in said chamber means, means including control line means connected to said control valve means for delivering fluid under pressure to said control valve means, said control valve means including flow control means operable between first and second positions, said flow control means in said first position connecting said chamber means with said vacuum line portion, and said flow control means in said second position connecting said chamber means with said control line means.

5. The improvement according to claim 4, wherein said control valve means further includes normally closed check valve means in said vacuum line portion permitting flow in the direction from said chamber means toward said location.

6. The improvement according to claim 1, wherein said normally open valve means has a downstream end and said main flow line means includes a sleeve section downstream of said normally open valve means, said location being defined by an opening radially through said sleeve section, said sleeve section including nipple means surrounding said opening and extending radially outwardly of said sleeve section, and said control valve means including normally closed check valve means in said nipple means permitting flow in the direction radially inwardly of said sleeve section.

7. The improvement according to claim 6, wherein said check valve means comprises a tubular member of elastomeric material including wall means having opposite ends, said wall means at one of said ends being open to provide an entrance for fluid flow into said member in a first direction from said one end toward the other, said wall means at said other of said ends being constricted to close said other end against fluid flow into said member in the direction opposite said first direction, and said wall means at said other end being expandable to permit fluid flow through said member in said first direction.

8. In a fluid flow system including main flow line means connected to a fluid supply and having a discharge end, means to pump fluid from said supply toward said discharge end, said main flow line means including normally open valve means between said supply and said pump means and including a housing supporting resilient sleeve means therein for a portion of said sleeve means to be constrictable relative to said housing to close said valve means and to define variable volume chamber means with said housing, and means to constrict said portion of said sleeve to close said valve means, the improvement comprising: means providing vacuum flow line means connecting said chamber means in fluid flow communication with said main flow line means at a location downstream of said constrictable portion of said sleeve means, said means providing vacuum flow line means including control valve means to prevent flow of fluid from said main flow line means to said chamber means, and flow restriction means in said main flow line means between said constrictable portion of said sleeve means and said location.

9. In a fluid flow system including main flow line means connected to a fluid supply and having a discharge end, means to pump fluid from said supply toward said discharge end, said main flow line means including normally open valve means between said supply and said pump means and including a housing supporting resilient sleeve means therein for a portion of said sleeve means to be constrictable relative to said housing to close said valve means and to define variable volume chamber means with said housing, and means to constrict said portion of said sleeve to close said valve means, the improvement comprising: means providing vacuum flow line means connecting said chamber means in fluid flow communication with said main flow line means at a location downstream of said constrictable portion of said sleeve means, and means providing vacuum flow line means including control valve means to prevent flow of fluid from said main flow line means to said chamber means, said normally open valve means having a downstream end and said main flow line means including a sleeve section downstream of said normally open valve means, said location being defined by an opening radially through said sleeve section, said sleeve section including nipple means surrounding said opening and extending radially outwardly of said sleeve section, and said control valve means including normally closed check valve means in said nipple means permitting flow in the direction radially inwardly of said sleeve section, said sleeve section having upstream and downstream ends, said opening being between said ends, and flow restriction means in said sleeve section between said opening and said upstream end.

10. In a fluid flow system including main flow line means connected to a fluid supply and having a discharge end, means to pump fluid from said supply toward said discharge end, said main flow line means including normally open valve means between said supply and said pump means and including a housing supporting resilient sleeve means therein for a portion of said sleeve means to be constrictable relative to said housing to close said valve means and to define variable volume chamber means with said housing, and means to constrict said portion of said sleeve to close said valve means, the improvement comprising: means providing vacuum flow line means connecting said chamber means in fluid flow communication with said main flow line means at a location downstream of said constrictable portion of said sleeve means, said means providing vacuum flow line means including control valve means to prevent flow of fluid from said main flow line means to said chamber means, said normally open valve means having a downstream end and said main flow line means including a sleeve section downstream of said normally open valve means, said location being defined by an opening radially through said sleeve section, said sleeve section including nipple means surrounding said opening and extending radially outwardly of said sleeve section, and said control valve means including normally closed check valve means in said nipple means permitting flow in the direction radially inwardly of said sleeve section, said check valve means comprising a tubular member of elastomeric material including wall means having opposite ends, said wall means at one of said ends being open to provide an entrance for fluid flow into said member in a first direction from said one end toward the other, said wall means at said other of said ends being constricted to close said other end against fluid flow into said member in the direction opposite said first direction, and said wall means at said other end being expandable to permit fluid flow through said member in said first direction, said sleeve section having upstream and downstream ends, said opening being between said ends, and flow restriction means in said sleeve section between said opening and said upstream end.

11. The improvement according to claim 10, wherein said sleeve section includes a removable liner of elastomeric material and said flow restriction means is integral with said liner.

12. The improvement according to claim 10, wherein said control valve means includes a second control valve, said means providing vacuum flow line means including conduit means connecting said second control valve with said entrance passage surrounding said opening through said sleeve section and means connecting said second control valve in flow communication with said chamber means, said means to constrict said sleeve means being fluid under pressure in said chamber means, means including control line means connected to said second control valve for delivering fluid under pressure to said second control valve, said second control valve including flow control means operable between first and second positions, said flow control means in said first position connecting said chamber means with said conduit means, and said flow control means in said second position connecting said chamber means with said control line means.

* * * * *